Figure 1:
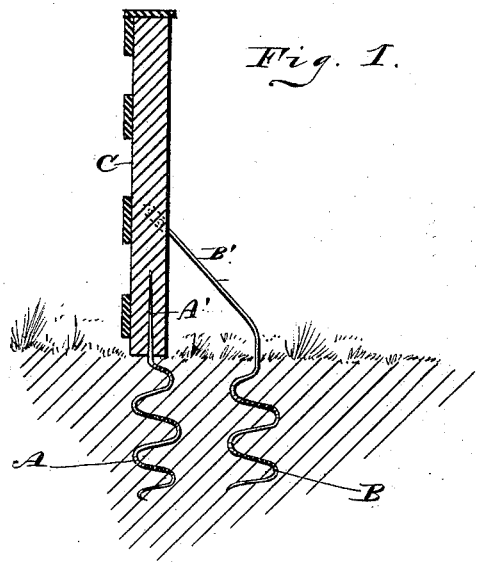

(No Model.)

F. F. WYMAN.
FENCE POST.

No. 257,199. Patented May 2, 1882.

WITNESSES  INVENTOR
Fred F Wyman
By Leggett & Leggett
ATTORNEYS

UNITED STATES PATENT OFFICE.

FRED F. WYMAN, OF BRUNSWICK, OHIO.

FENCE-POST.

SPECIFICATION forming part of Letters Patent No. 257,199, dated May 2, 1882.

Application filed January 3, 1882. (No model.)

*To all whom it may concern:*

Be it known that I, FRED F. WYMAN, of Brunswick, in the county of Medina and State of Ohio, have invented certain new and useful Improvements in Fence-Posts; and I do hereby declare the following to be a full, clear, and exact description of the invention, such as will enable others skilled in the art to which it pertains to make and use the same.

My invention relates to fence-posts; and it consists in the peculiar construction of the same, as will be hereinafter fully set forth and claimed.

In the drawings, Figure 1 is a vertical cross-section of a post, and showing it as set up or erected.

A is a piece of metal, which is formed at its lower end with a screw constructed in such a manner as to be adapted to screw into the ground, and provided at its upper end with a shank or tang, A'.

B is another piece of metal, provided at its lower end with a screw adapted to be screwed in the ground.

It will be observed that the screw-threaded portion B of the brace is inserted vertically, while the shank B' is bent at an angle to the screw-threaded portion, the upper end of the shank being fastened to the post. This construction of brace has two advantages: First, the bent shank serves as a handle to screw the lower end into the ground; and, second, by arranging the shank at an angle to the screw I am enabled to secure an extended lateral bearing of the screw in the earth, as well as insure its resistance to end thrust or pull common to any form of screw-shank.

C is a wooden post, which may or may not be provided with the holes *a* and *b*.

The manner of setting up my fence is as follows: The piece of metal A is first screwed into the ground, at the desired point where it is intended to erect the post, by means of a wrench suitably constructed to grasp the shank A'. This piece A is entered into the ground until the shank or tang only extends above the ground. The brace or piece B is next screwed into the ground a suitable distance from the piece A, and in such a manner that its upper end, B', will be at an angle to the shank A' of the piece A. The post C is now driven on the shank A' until its lower end has reached the ground. The top end, B', of the brace B is now secured to said post in any suitable manner—viz., by means of nails or screws, or otherwise.

By constructing and erecting a post as above described I have a cheap and strong post, and one which is quickly and easily erected or taken down.

What I claim is—

The combination, with the fence-post C, of the screw A, provided with the sharpened tang A', adapted to be driven into the lower end of the post, and the brace provided with the vertically-arranged screw portion B and the inclined portion B', the latter adapted to be secured to the side of the post, substantially as set forth.

In testimony whereof I have signed my name to this specification in the presence of two subscribing witnesses.

FRED F. WYMAN.

Witnesses:
JNO. CROWELL, Jr.,
ALBERT E. LYNCH.